Figure 1:
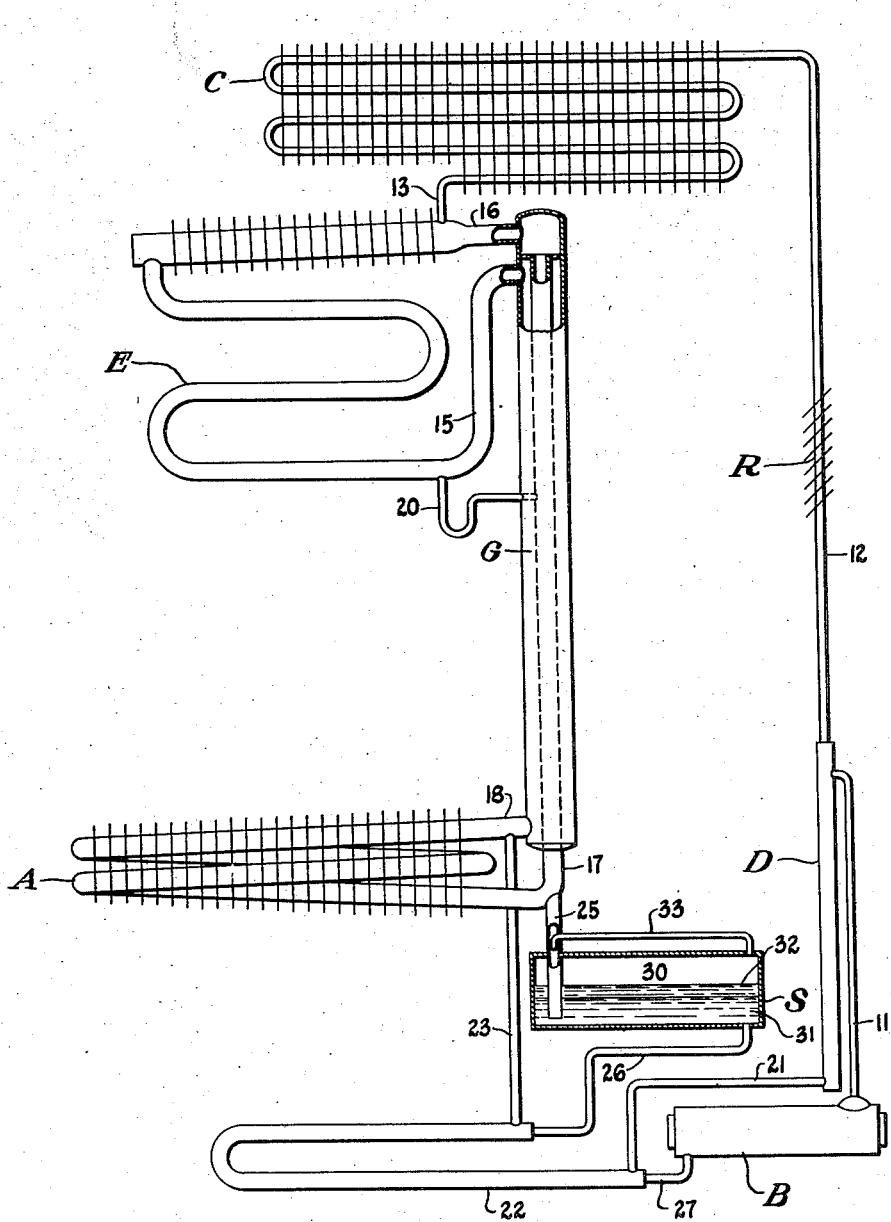

Patented Jan. 17, 1950

2,494,989

UNITED STATES PATENT OFFICE 2,494,989

REGULATING PRESSURES IN AN ABSORPTION REFRIGERATING SYSTEM IN ACCORDANCE WITH AMBIENT TEMPERATURES

Curtis C. Coons, North Canton, Ohio, assignor to The Hoover Company, North Canton, Ohio, a corporation of Ohio Application March 27, 1947, Serial No. 737,547

11 Claims. (Cl. 62—119.5)

The present invention relates to the art of refrigerating and more particularly to refrigerating systems of the so called pressure equalized type which are provided with means tending automatically to compensate the system to maintain optimum operating conditions with varying ambient conditions.

The pressure equalized inert gas type absorption refrigerating machine possesses the characteristics that it operates with maximum economy under any given cooling medium temperature conditions at certain total internal pressures. If an apparatus is so charged that its internal pressure is at the optimum value for operation in a 70° Fahrenheit atmosphere, for example, an increase in the surrounding temperature will produce an increase in the system pressure due to the tendency of the material therein, particularly the gaseous materials, to expand. Such an increase in pressure does not increase the system pressure up to the new optimum internal pressure which corresponds to the new ambient conditions. As the temperature increases progressively above the optimum charging condition, the economy of the machine falls off and ultimately a point is reached at which the apparatus ceases to perform its intended function. This decrease in the operating ability of the apparatus appears in a number of ways, one of the most significant of which is a failure to condense all of the refrigerant vapor which is developed in the generator of the system. The uncondensed vapor then passes directly into the inner gas stream and is re-absorbed and returned to the boiler without liquefying and re-evaporating to produce a useful refrigerating effect.

Apparatuses of this type are customarily provided with a liquid receiver in the solution circuit which serves to stabilize the operation of the circulating pump in the solution circuit, to maintain a fairly constant head on the generator, and to provide a reserve supply of absorbing solution.

It is an object of the present invention to utilize a gas space provided in the usual solution reservoir for the purpose of maintaining a reserve supply of non-condensible gas which, under suitable conditions, is displaced therefrom into the body of inert gas circulating between the evaporator and absorber and is replaced by the vapor of a fluid in the system which is normally in the liquid state.

It is a further object of the present invention to provide a pressure equalized type absorption refrigerating system with a vessel which normally contains both inert gas and absorbing solution so connected into the solution circuit that the normal connection thereof in effect forms a trap for the inert gas. The inert gas space of this vessel is provided with diffusion connections to other portions of the system so that a change of a fluid in the system from the liquid to a vapor state in response to increasing ambient temperature conditions displaces the inert medium from the reservoir and stores the additional vapor in the vapor space to increase the total system pressure to the above mentioned optimum operating pressure for the particular ambient temperature condition.

It is a further object of the present invention to provide a pressure equalized absorption refrigerating system with a combined liquid receiver and inert gas storage vessel so connected into the system that inert gas circulates into and out of this vessel through a circuit which includes a portion of the normal absorber-evaporator inert gas circuit and a refrigerant liquid pre-cooler.

It is a futher object of the present invention to provide an absorption refrigerating system of the inert gas type with a vessel which functions as a part of the normal solution circuit having absorption solution therein which is separated from the inert gas by a blanket of liquid floating thereupon which is substantially incapable of absorbing refrigerant vapor.

It is a further object of the present invention to provide a pressure equalized absorption refrigerating system with a combined liquid receiver and pressure equalizing medium storage vessel which contains an additional fluid medium which condenses and vaporizes with varying ambient conditions to change the quantity of vapor and gas in the whole refrigerating system and thus vary the pressure thereof to the optimum value required for particular ambient conditions.

Figure 2:
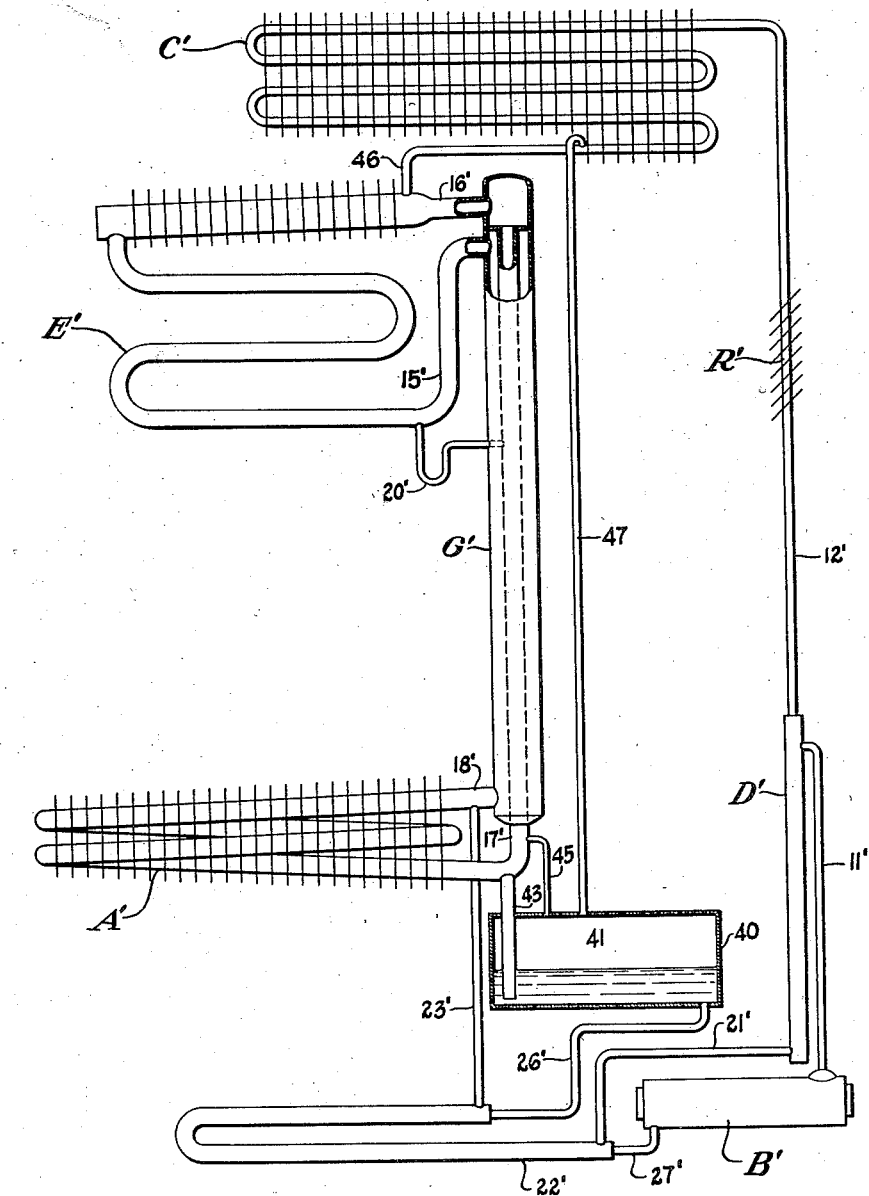

In the accompanying drawing Figure 1 is a schematic representation of one form of the present invention and Figure 2 is a schematic representation of a modified form of the invention.

Referring now to the drawing in detail and first of Figure 1 thereof, the apparatus comprises a boiler B which contains a solution of a refrigerant such as ammonia in an absorbent therefor such as water. The application of heat to the boiler causes refrigerant vapor to be evolved from the solution. The vapor so evolved rises upwardly through the vapor lift pipe 11 carrying therewith solution which has been deprived of some of its refrigerant vapor content. The vapor lift pump 11 discharges into the gas separation chamber D in which the liquid and vapor separate. The refrigerant vapor is conducted from the chamber D to the tubular air cooled condenser C by a conduit 12 which includes an air cooled rectifier R.

The refrigerant vapor is liquefied in the condenser C and flows through conduit 13 into the upper finned air cooling portion of an evaporator E.

The evaporator E is linked in a circuit for an inert pressure equalizing medium, that is, a gas which is inert with respect to the refrigerant and the absorbent such as hydrogen. The inert gas is supplied to the evaporator E from a gas heat exchanger G through the conduit 15. The inert gas flows upwardly through the evaporator in contact and in counter-flow relation with the liquid refrigerant which evaporates into the gas to produce a refrigerating effect. The resulting inert gas refrigerant vapor mixture discharges fom the evaporator E through the conduit 16 into the inner path of the gas heat exchanger G. After traversing the inner path of the gas heat exchanger G, the inert gas refrigerant vapor mixture flows through the conduit 17 into the lower end of a tubular air cooled absorber A.

The inert gas refrigerant vapor mixture flows upwardly through the absorber A in contact and in counter-flow relation with lean absorbing solution which is supplied to the upper end thereof in a manner to be described hereinafter. In the absorber A the absorbing solution absorbs refrigerant vapor from the mixture and the resulting lean inert gas refrigerant vapor mixture is returned to the evaporator E by way of conduit 18, the outer path of the gas heat exchanger G and the conduit 15 thus completing the inert gas circuit.

Any unevaporated liquid which traverses the evaporator E is drained therefrom to the inner path of the gas heat exchanger G by a conduit 20 which contains a U-shaped gas sealing trap. Such liquids then flow through the gas heat exchanger and conduit 17 to rejoin the absorbing solution circuit.

The lean absorbing solution supplied to the gas separation chamber D is conveyed therefrom to the gas outlet pipe 18 of the absorber A by conduit 21, liquid heat exchanger 22 and conduit 23. The solution flows downwardly through the absorber in contact with the inert gas refrigerant vapor mixture flowing from the evaporator E and increases its refrigerant content to produce a strong solution. The strong solution is conveyed from the bottom of the absorber through a conduit 25 into the interior of a reservoir vessel S and adjacent the bottom portion thereof. The solution is then conveyed from the reservoir S to the generator B by way of conduit 26, the liquid heat exchanger 22 and the conduit 27 thus completing the absorbing solution circuit.

The liquid level condition illustrated for the reservoir S is approximately that which obtains during the operation of the system. It is this liquid level which provides the depth of immersion or reaction head effective upon the vapor lift pump 11.

It will be noted that the conduits 25 and 26 both open into the reservoir S well below the liquid level therein maintained so that they in effect form a trap for the gas contained in the upper gas space 30 in the reservoir S.

A body of an auxiliary medium 32, such as propane or butane, in the liquid state is shown floating upon the surface of the absorbing solution in the reservoir S. The auxiliary medium is inert to the other fluids of the system and will undergo a progressive change in state as the cooling air temperature varies. The auxiliary medium should not absorb refrigerant vapor to any significant extent. The auxiliary medium such as propane 32 segregates the absorbing solution from the inert gas in the gas space 30. The gas space 30 is vented through a restricted conduit 33 which opens into the conduit 25 just above the point at which it enters the reservoir S.

In the normal operation of this form of the apparatus, the refrigerant, inert gas and absorbing solution circulate through their respective circuits in the manner described above. Assuming that the apparatus is charged with absorbing solution, refrigerant, inert gas and propane to the pressure giving optimum operating conditions with 70° Fahrenheit cooling air, the system will quickly stabilize itself after a short period of operation so that there is a substantial pool of propane 32 floating upon the absorbing solution in the reservoir S. It is desirable that the propane shall not circulate through the system to any significant degree. It is for this reason that the absorbing solution connection in effect form traps for a gas space 30 and the conduit 33 is a restricted connection so that any inert gas or propane vapor which escapes from the space 30 must normally do so solely by diffusion through the long restricted conduit 33. Under normal operating conditions, some propane exists in the inert gas circuit, its concentration is however limited by the evaporator in which it condenses and flows through conduit 20, the inner passage of gas heat exchanger G and conduits 17 and 25 back to the reservoir S. For example, if the temperature in the evaporator is 0° Fahrenheit the propane will exert a partial pressure only in the neighborhood of 40 pounds per square inch absolute which will increase to 66 pounds per square inch absolute if the evaporator temperature should rise as high as 30° Fahrenheit. The partial pressure of the propane in the gas space 30 is much higher than this value because that is determined by the ambient temperatures. For example, at 70° Fahrenheit ambient temperature the total system pressure will be in the neighborhood of 240 pounds per square inch and the propane pressure 124 pounds per square inch in the reservoir. If the ambient temperature should increase to 125° Fahrenheit, the propane will exert a partial pressure of 254 pounds per square inch absolute in the gas space 30 and the total system pressure will be proportionately higher.

From the foregoing it is clear that in normal operation of the system the propane exerts only a minor partial pressure in the normal inert gas circuit linking the evaporator-absorber and that it exerts a much higher partial pressure within the gas space 30 corresponding to the vaporization point of propane at the prevailing temperature in the reservoir S. As the ambient temperature increases, more and more propane vaporizes from the pool in the reservoir S considerably increasing the partial pressure of the propane in this part of the system. As the propane vaporizes, inert gas is forced through the conduit 33 and conduit 25 into the circuit linking the evaporator E and absorber A, that is, the quantity of inert gas in this portion of the system is increased. Additionally, the total system pressure rises due to the fact that material which under lower temperature conditions existed as a liquid now exists in the vapor state. This increase in the total system pressure maintains that pressure at the optimum value for ambient conditions and insures condensation of the refrigerant vapor supplied to the condenser C under such varying conditions.

As the ambient temperature decreases the reservoir S and its contents also decrease in temperature. As a direct consequence of this action, the partial pressure of the propane decreases accordingly and some propane therefore condenses. As the propane returns to the liquid state inert gas flows through conduits 25 and 33 into the space 30 to replace the propane which has condensed. This action results in decreasing the total pressure of the system to the optimum value corresponding to the new ambient condition.

Referring now to Figure 2 of the drawing, a modified form of the invention is illustrated. A major portion of this system is identical with that described in connection with Figure 1, therefore, corresponding identical parts in the two systems are given the same reference characters distinguished by a prime.

This system differs from that described in connection with Figure 1, among other things, in that it does not have a second auxiliary fluid such as propane. The charge consists solely of the absorbent such as water, refrigerant such as ammonia, and inert pressure equalizing medium such as hydrogen.

The solution circuit in this form of the invention is identical and operates identically with that described in connection with Figure 1 except in the following particulars. The solution reservoir 40 is provided with a gas space 41 above the absorbing solution. The rich absorbing solution formed in the absorber A' flows through a conduit 43 into the solution in the reservoir 40. The conduit 43 extends downwardly into the body of solution in the vessel 40 to form a gas seal therewith.

The gas space 41 communicates with the gas inlet conduit 17' of the absorber through a restricted conduit 45.

The condenser C' of this form of the invention is identical with that heretofore described, however, the liquid refrigerant formed in the condenser C' flows to the evaporator through a conduit 46 which opens into the upper end of the evaporator E' at the point corresponding to the point at which conduit 13 connects to the evaporator E in Figure 1. The conduit 46 communicates through a conduit 47 with the gas space 41 of the vessel 40. The conduit 47 communicates with the conduit 46 at the upper portion thereof to prevent liquid refrigerant from flowing through conduit 47 into the vessel 40.

The conduit 46—47, gas space 41 and conduit 45 form an auxiliary path of flow of inert gas connected in parallel with that formed by conduit 16', the inner path of the gas heat exchanger G' and conduit 17'. Since the various conduits forming this auxiliary circuit are small and the conduit 45 is restricted, only a comparatively small quantity of inert gas circulates therethrough. Some of the rich inert gas formed in the evaporator does however flow through the conduit 46 over and in contact with liquid refrigerant flowing therethrough. Some of the liquid in the conduit 46 evaporates into the inert gas with a consequent refrigerating effect which pre-cools the liquid which is supplied to the evaporator E'. This action relieves the evaporator E' of some of the load normally placed on an evaporator in inert gas type absorption refrigerating machine. Due to the fact that the gas in conduit 47 is very rich and therefore comparatively dense, it flows downwardly into the space 41 and displaces gas through conduit 45 into the conduit 17' for passage through the absorber to cause absorption of vapor produced in conduit 46 into the absorbing solution.

The liquid connection conduits 43 and 26' to the reservoir 40 are both sealed by the liquid therein contained so that inert gas cannot flow to and from the reservoir 40 through either of these conduits. The only path of gas into and out of the gas space 41 above the solution in reservoir 40 is through the conduits 47 and 45 described heretofore.

The restricted inert gas circulation through conduits 45 and 47 brings very rich inert gas into the reservoir 40. This gas is in contact with the solution in the reservoir and a layer of highly saturated solution floats on top of the solution pool. This layer maintains itself with reasonable constancy as rich solution and is appreciably lighter than leaner solution. In consequence of the foregoing, the gas space 41 contains an inert gas refrigerant vapor mixture under all conditions of operation and normal refrigerating temperature conditions which is separated from the solution flowing to the generator by a substantially static blanket of liquid which is substantially unable to absorb refrigerant vapor from the gas vapor mixture thereabove. It is advantageous to maintain the saturated liquid blanket and to allow the active solution to circulate therebeneath for reasons to be developed hereinafter.

Assuming that the apparatus is charged for operation at 70° Fahrenheit cooling temperature, for example, the space 41 will contain inert gas mixed with some refrigerant vapor which is produced as a result of pre-cooling in the conduit 46. As the ambient temperature increases, a point will be reached at which all of the refrigerant vapor supplied to the condenser C' fails to condense. Uncondensed vapor will then flow through the conduit 47 into the reservoir 40 and will displace the inert gas therefrom through conduit 45 into the main inert gas circuit linking the absorber A' and evaporator E'. This condition will be maintained after a rapid establishment of a new refrigerant vapor pressure-inert gas partial pressure equilibrium. The change of some refrigerant from liquid to vapor state and displacement of inert gas thereby into the inert gas circuit increases the system pressure to the point at which condensation is again complete. The highly saturated layer of solution floating on the surface of the circulating solution prevents significant absorption of refrigerant vapor from the condenser and insures that refrigerant vapor will remain in the vapor state and displace inert gas as long as elevated temperature conditions prevail. When the ambient temperature decreases, the increased condensation ability of the system will cause inert gas to flow through conduit 47 and to displace refrigerant vapor from the gas space 41 thus restoring initial conditions.

In this form of the invention, like that described above, the reservoir contains a gas space, liquid sealed from the main inert gas circuit through the normal solution circuit connections, having a restricted diffusion connection with the main inert gas circuit to allow restricted flow of inert gas from the space to the main inert gas circuit. The liquid pool in the solution reservoir has a liquid body floating on the surface thereof which segregates the active solution circulating in the solution circuit from the reserve supply of inert gas contained thereabove. In this form of the invention also, inert gas is displaced from the reserve gas space 41 of the receiver into the inert gas circuit when a substance which was previously liquid in the system changes to the vapor phase due to increasing ambient temperature conditions to increase the total system pressure and the total quantity of inert medium circulating in the inert gas circuit linking the evaporator and absorber.

While both forms of the invention have been illustrated in connection with the type of system in which the solution is circulated by a heat operated pump and the inert gas is circulated by gravitational forces, the invention is equally applicable to systems in which mechanical means are provided for circulating the absorbing solution and/or inert gas.

While the invention has been illustrated and described in detail in two forms, various modifications may be made in the arrangement and the construction of parts without departing from the spirit of the invention or the scope of the appended claims.

I claim:

1. That improvement in the art of refrigeration which includes the steps of applying heat to a solution of a refrigerant in an absorbent to liberate refrigerant vapor, condensing the said liberated vapor by passing the same in heat exchange with a cooling medium, evaporating the condensed refrigerant to produce a refrigerating effect by passing the condensed refrigerant into the presence of a gaseous medium which is inert with respect to the refrigerant and the absorbent, returning the refrigerant vapor into solution in the absorbent by passing the mixed inert medium and refrigerant vapor into contact with absorbent and rejecting the heat of absorption to a cooling medium and compensating for variations in cooling medium temperature by maintaining a fourth condensible medium which is inert to the other mediums in the system in contact with absorbing solution and excess inert medium in a body which is at substantially cooling medium temperature.

2. Absorption refrigerating apparatus including an evaporator and an absorber connected to form a circuit for inert gas therethrough and therebetween, a generator, a condenser connected to receive refrigerant vapor from said generator and to supply refrigerant liquid to said evaporator, an absorber, means including a reservoir vessel connecting said generator and said absorber for circulation of absorbing solution therethrough and therebetween, said reservoir being so connected in said solution circuit that a gas space is provided above the liquid level therein and solution inlet and outlet connections thereto are provided adjacent its bottom portion below the said liquid level, means providing restricted communication between said inert gas circuit and the upper gas space in said reservoir, and a body of highly saturated absorbing solution floating on the surface of the solution in said reservoir.

3. Absorption refrigerating apparatus including an evaporator and an absorber connected to form a circuit for inert gas therethrough and therebetween, a generator, a condenser connected to receive refrigerant vapor from said condenser and to supply refrigerant liquid to said evaporator, an absorber, means including a reservoir vessel connecting said generator and said absorber for circulation of absorbing solution therethrough and therebetween, said reservoir being so connected in said solution circuit that a gas space is provided above the liquid level therein and solution inlet and outlet connections thereto are provided adjacent its bottom portion below the said liquid level, means providing restricted communication between said inert gas circuit and the upper gas space in said reservoir, and a body of liquid which is progressively vaporizable and condensible as the temperature of said reservoir varies floating on the surface of the liquid therein contained.

4. Absorption refrigerating apparatus including an evaporator and an absorber connected to form a circuit for inert gas therethrough and therebetween, a generator, a condenser connected to receive refrigerant vapor from said condenser and to supply refrigerant liquid to said evaporator, an absorber, means including a reservoir vessel connecting said generator and said absorber for circulation of absorbing solution therethrough and therebetween, said reservoir being so connected in said solution circuit that a gas space is provided above the liquid level therein and solution inlet and outlet connections thereto are provided adjacent its bottom portion below the said liquid level, means providing restricted communication between said inert gas circuit and the upper gas space in said reservoir, and a body of propane floating on the surface of the absorbing solution in said reservoir.

5. Refrigerating apparatus comprising means forming a circuit for inert gas including an evaporator and an absorber, a generator, a condenser connected to receive refrigerant vapor from said generator and to supply refrigerant liquid to said evaporator, means forming an absorbing solution circuit including said generator and said absorber and a liquid receiver having liquid inlet and outlet connections adjacent its bottom portion, said liquid receiver being so positioned in said absorbing solution circuit that solution stands therein above the level of said inlet and outlet connections and below the top wall thereof to provide a gas space, and means providing restricted communication between said gas space in said receiver and said inlet connection above the liquid level in said receiver.

6. Refrigerating apparatus comprising means forming a circuit for inert gas including an evaporator and an absorber, a generator, a condenser connected to receive refrigerant vapor from said generator and to supply refrigerant liquid to said evaporator, means forming an absorbing solution circuit including said generator and said absorber and a liquid receiver having liquid inlet and outlet connections adjacent its bottom portion, said liquid receiver being so positioned in said absorbing solution circuit that solution stands therein above the level of said inlet and outlet connections and below the top wall thereof to provide a gas space, conduit means connecting a portion of said condenser remote from said generator and said gas space in said receiver and means connecting said receiver to said inert gas circuit adjacent said absorber.

7. In a refrigerating system of the pressure equalized absorption type, an evaporator and an absorber connected to form a circuit for an inert gas, a generator, means for liquefying refrigerant vapor evolved in said generator and for supplying refrigerant liquid to said evaporator, means connecting said generator and said absorber for circulation of absorbing solution therebetween including a solution reservoir connected to receive enriched solution from said absorber and to supply enriched solution to said generator, the upper wall of said reservoir being positioned above the liquid level in said reservoir to provide a space for inert gas, and means connecting said space to said inert gas circuit to provide flow of inert gas to and from said reservoir as a liquid medium in the system vaporizes and displaces inert gas from said reservoir into said inert gas circuit.

8. In a refrigerating apparatus charged with a plurality of fluids which are at least partially in the liquid state at all times and a non-condensible gas, an absorber and an evaporator connected for circulation of inert gas therebetween, a generator, a reservoir, means connecting said generator and said absorber and said reservoir to form a circuit for absorption solution, said reservoir being of such size and so positioned in said solution circuit that a large gas space is provided therein above the surface of absorption solution therein, said solution circuit including solution inlet and outlet connections to said reservoir beneath the surface of the solution in said reservoir, and conduit means providing restricted communication between said gas space in said reservoir and portions of said system containing inert gas and refrigerant to allow inert gas and the vapor of one of said fluids to pass to and from said reservoir gas space.

9. Absorption refrigerating apparatus charged with noncondensible and vaporizable media comprising means forming a circuit for non-condensible pressure equalizing medium including an evaporator and an absorber, a generator, means for condensing vapor of refrigerant medium evolved in said generator and for supplying refrigerant medium in the liquid state to said evaporator, means interconnecting said generator and said absorber for circulation of a liquid absorbing medium therethrough including a reservoir vessel having a gas space above a liquid level therein, the liquid in said reservoir at said liquid level being substantially incapable of absorbing vapor of said vaporizable media under the internal operating conditions of said apparatus, and conduit means inter-connecting said gas space with said pressure equalizing medium circuit arranged to provide for displacement of pressure equalizing medium between said gas space and said pressure equalizing medium circuit as a vaporizable medium in the apparatus changes between vapor and liquid states in response to variations in ambient temperature.

10. Absorption refrigerating apparatus charged with non-condensible and vaporizable media including pressure equalizing, refrigerating and absorbing media, said apparatus comprising structure forming circuits for pressure equalizing medium and absorbing media, said circuit for absorbing media including a portion common to said pressure equalizing medium circuit and a portion not in said pressure equalizing medium circuit, said last mentioned portion of said absorbing media circuit including a part having a gas space above a level of absorbing media in liquid phase, absorbing media inlet and outlet connections to said part below said liquid level, and conduit means interconnecting said gas space of said part with said pressure equalizing medium circuit arranged to provide for displacement of pressure equalizing medium between said space and said pressure equalizing medium circuit as a vaporizable medium in the apparatus vaporizes and condenses in response to variations in ambient temperature.

11. Absorption refrigerating apparatus charged with non-condensible and vaporizable media including pressure equalizing, refrigerating and absorbing media, said apparatus comprising structure forming circuits for pressure equalizing medium and absorbing media, said circuit for absorbing media including a portion common to said pressure equalizing medium circuit and a portion not in said pressure equalizing medium circuit, said last mentioned portion of said absorbing media circuit including a part having a gas space above a level of absorbing media in liquid phase, absorbing media inlet and outlet connections to said part below said liquid level, the liquid at said liquid level being substantially incapable of absorbing vapor under the internal operating conditions of the apparatus, and conduit means interconnecting said gas space of said part with said pressure equalizing medium circuit arranged to provide for displacement of pressure equalizing medium between said space and said pressure equalizing medium circuit as a vaporizable medium in the apparatus vaporizes and condenses in response to variations in ambient temperature.

CURTIS C. COONS.

REFERENCES CITED

The following references are of record in the file of this patent:

UNITED STATES PATENTS

| Number | Name | Date |
| --- | --- | --- |
| 2,274,660 | Brace | Mar. 3, 1942 |
| 2,297,280 | Beach | Sept. 29, 1942 |
| 2,326,900 | Thomas | Aug. 17, 1943 |